June 17, 1952  J. L. SOLOMON  2,600,585
THREE-PHASE WELDING SYSTEM WITH POSTHEAT CONTROL
Filed Feb. 9, 1950  4 Sheets-Sheet 1

Inventor.
Julius L. Solomon.
By Wilkinson Huxley Byron & Hume
Attys.

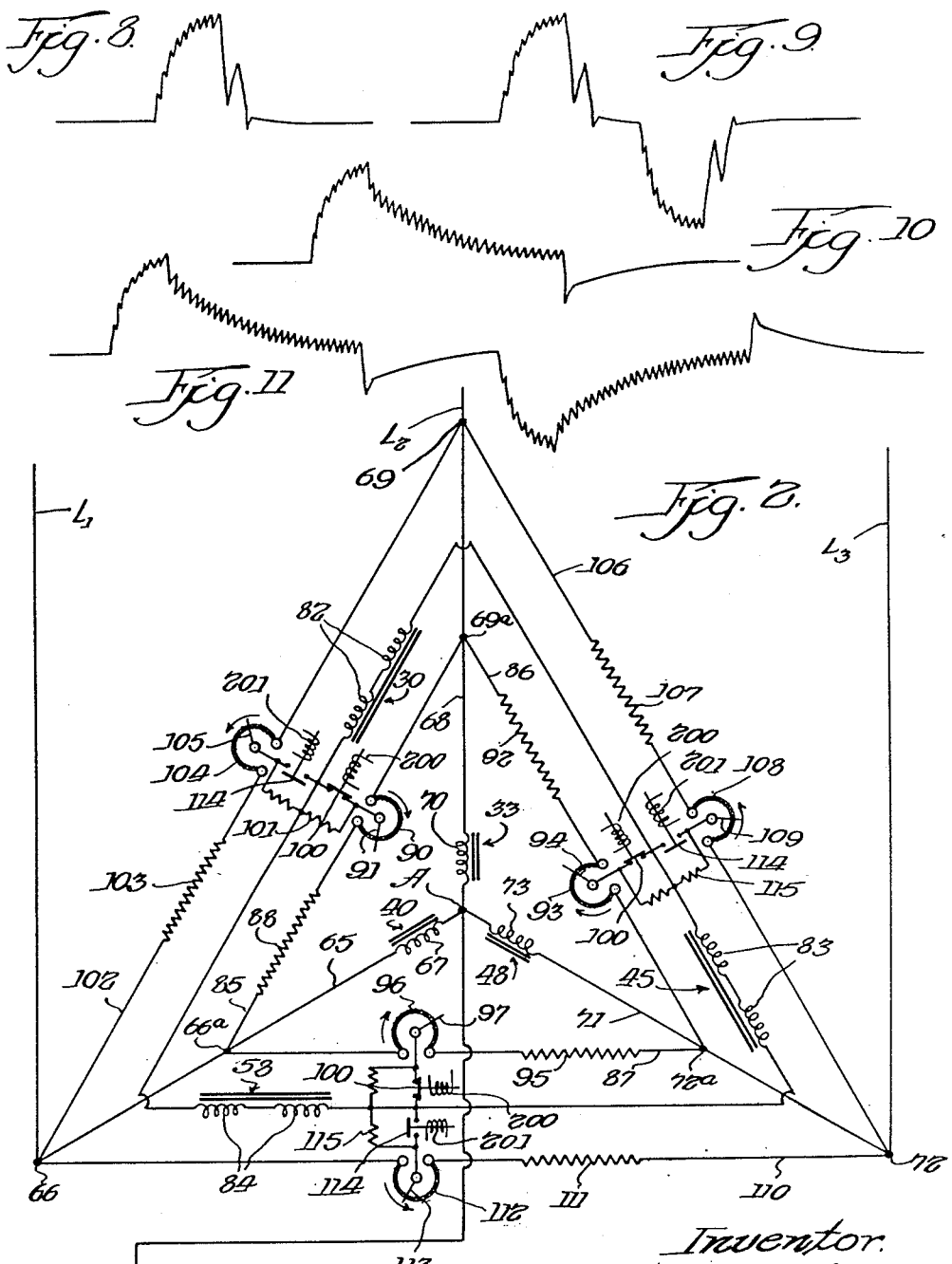

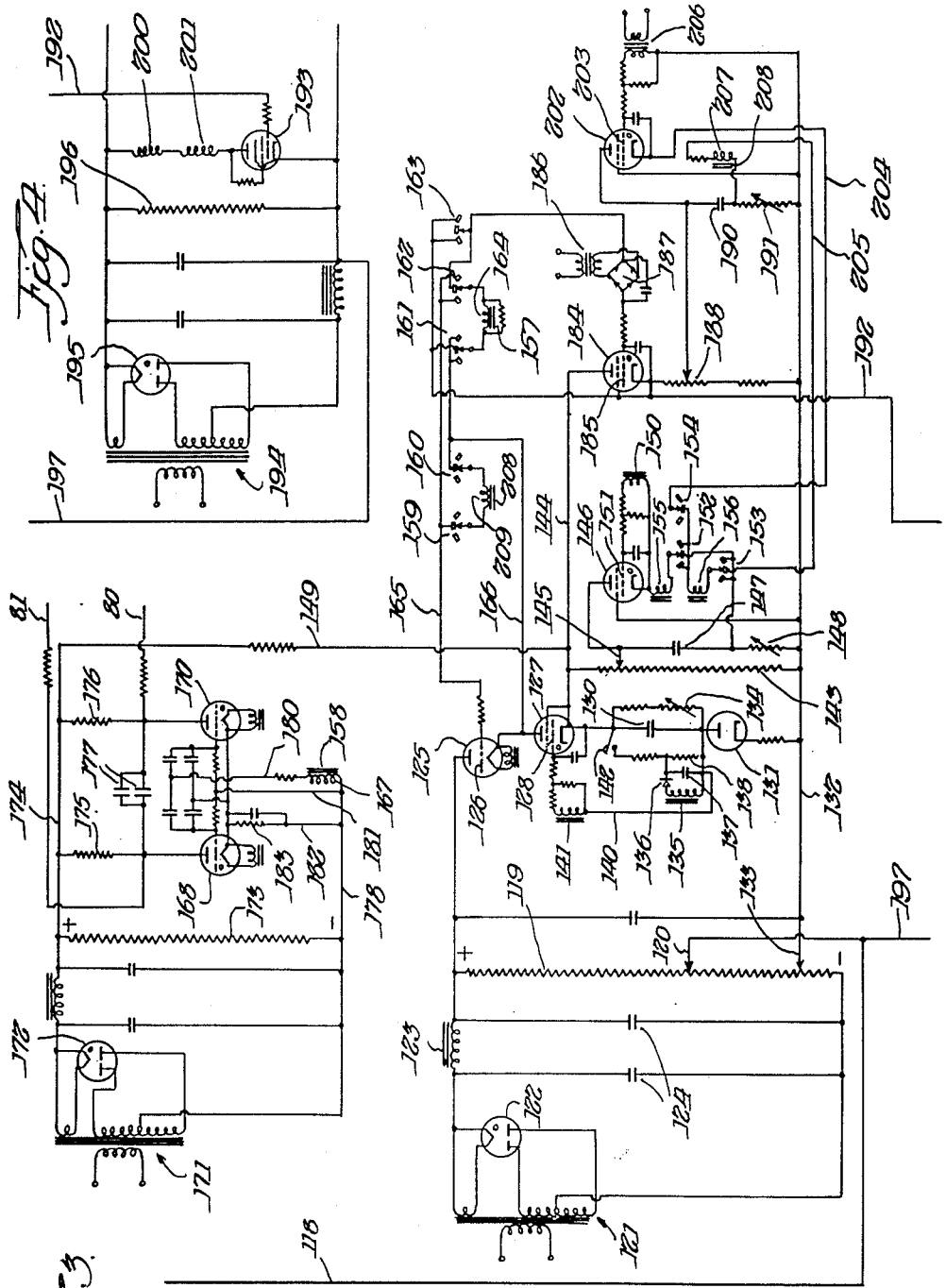

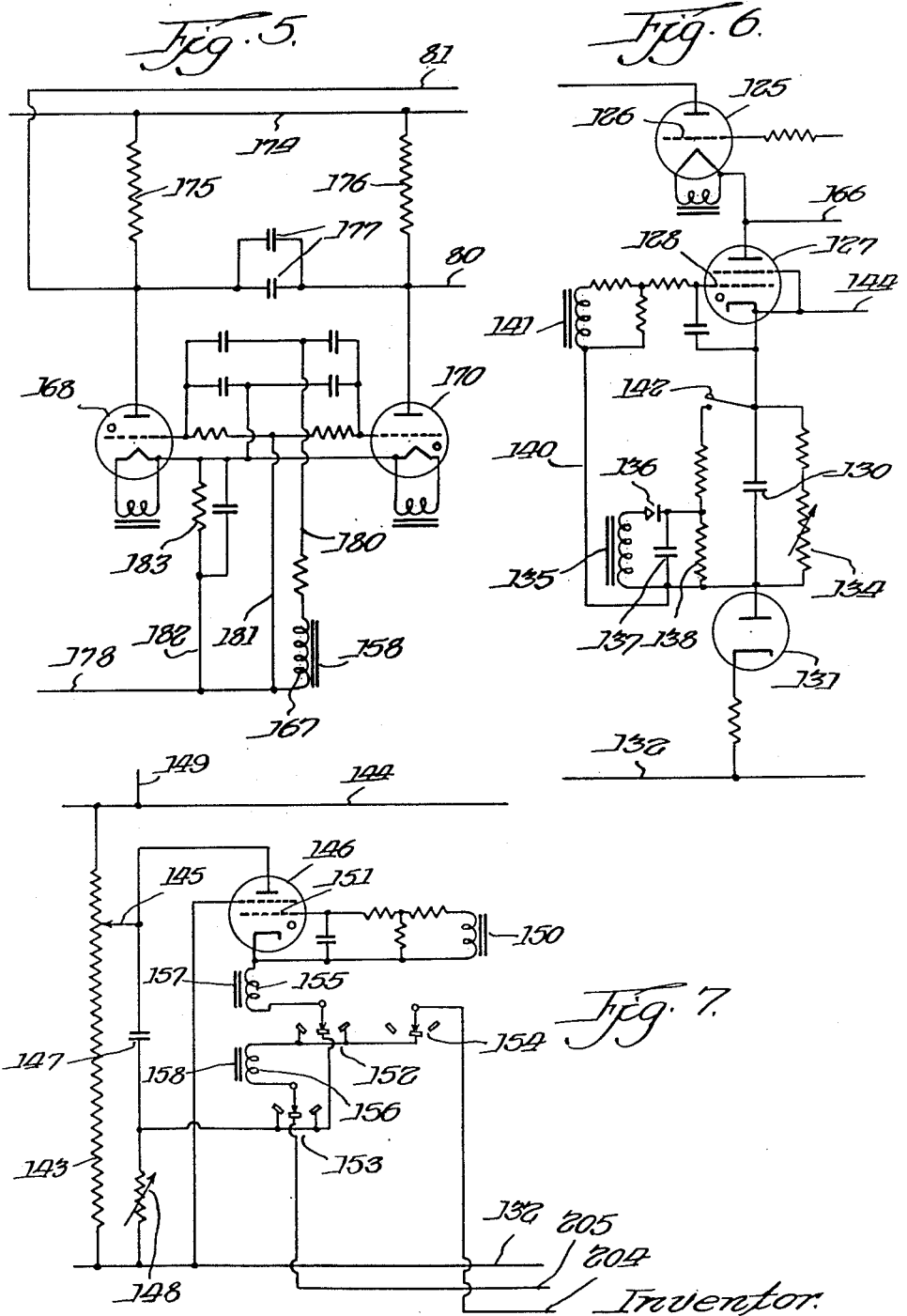

Patented June 17, 1952

2,600,585

UNITED STATES PATENT OFFICE 2,600,585

THREE-PHASE WELDING SYSTEM WITH POSTHEAT CONTROL

Julius L. Solomon, Chicago, Ill., assignor to Welding Research, Inc., Chicago, Ill., a corporation of Illinois Application February 9, 1950, Serial No. 143,241

16 Claims. (Cl. 323—34)

1

The invention relates to control circuits and has reference in particular to an improved electronic control and timing circuit especially designed for welding apparatus for producing single or multiple welding pulses of variable duration depending on the heat control setting and for also producing such welding pulses followed by a controlled decay of the welding current for postheating the weld metal to anneal the same.

The Sciaky Patent No. 2,431,083 granted November 18, 1947, discloses and claims an electric translating system for transferring energy from a polyphase alternating current source to a load circuit such as a welding circuit and wherein any one of three types of power may be secured in the welding circuit such as a single unidirectional current impulse, a series of unidirectional current impulses of the same polarity, or a series of current impulses, each impulse being opposite in polarity to the one immediately preceding it and so comprising a form of single phase alternating current. More particularly, the three phase-three winding system of said patent employs reactance means in the form of primary windings in inductive relation with a secondary load circuit and wherein each primary winding has individual circuit connections to its respective phase of the polyphase source of supply with electric discharge devices of the ignitron type being provided for controlling the rectified currents supplied to the windings respectively.

An object of the present invention is to provide an improved, simplified and efficient control circuit for firing the electric discharge devices in a welding system as described and wherein said discharge devices comprise two groups and which are rendered conductive in an alternate manner to pass current to the primary windings for predetermined welding periods with controllable periods of offtime between each welding period.

Another object of the invention is to provide an electronic control and timing circuit for a welding system which can be manually set for producing a single welding pulse of controlled duration or for producing multiple welding pulses and which can be manually set for producing such pulses of a modulated wave shape comprising a welding pulse followed by a controlled decay of the welding current for postheating the weld metal.

A further object of the invention resides in the provision of an electronic control circuit for the purposes described which will incorporate improved means for phase shifting the control grid voltages for firing the electric discharge devices

2 with respect to the voltages appearing across the polyphase source of supply whereby to control the magnitude of the current delivered to the respective windings for each energizing impulse.

Another object is to provide a novel phase shifting circuit having phase shifting means for controlling the magnitude of the welding current and also having phase shifting means for controlling the magnitude of the postheating current.

A still further object is to provide timing and reversing circuits especially designed for controlling the firing of the ignitron tubes in a welding system and which will incorporate separate and independent phase shifting means for controlling the magnitude of the welding current and the postheating current respectively, and wherein the control circuit arrangement when manually set will operate automatically at the end of the welding period to shift from the welding phase shift means to the postheating phase shift means.

A further object of the invention is to provide a fully electronic reversing and timing circuit for rendering groups of ignitrons alternately conductive and nonconductive and wherein the said reversing and timing circuit will incorporate a pair of electric valves also operating in an alternately conductive manner to provide said reversing control, with the switch from one valve to the other being automatic by reason of the circuit elements.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 2 is a schematic diagram illustrating the adjustable phase shifting circuit of the invention and which controls the magnitude of the welding current and also the postheating current;

Figure 3 is a schematic wiring diagram illustrating the electronic elements and circuit arrangements therefore as incorporated in the control and timing circuit of the present invention;

Figure 4 is a schematic wiring diagram showing another part of the control circuit of Figure 3 and which incorporates an electronic valve for effecting the automatic switching from one phase shift means to the other for postheating;

Figure 5 is a portion of the control circuit shown in Figure 3 enlarged, the same illustrating the reversing electric valves which control the potentials applied to the grids of the ignitrons;

Figure 6 is a portion of the control circuit of Figure 3 enlarged, the same showing the circuit connections for the adjustable resistance controlling the "off" time;

Figure 7 is a portion of the control circuit of Figure 3 enlarged, the same showing the circuit connections for the adjustable resistance controlling the "on" time; and Figures 8 to 11 show reproductions of actual oscillograms of welding current pulses comprising the output of a system embodying the improvements of the present invention.

Figure 1:
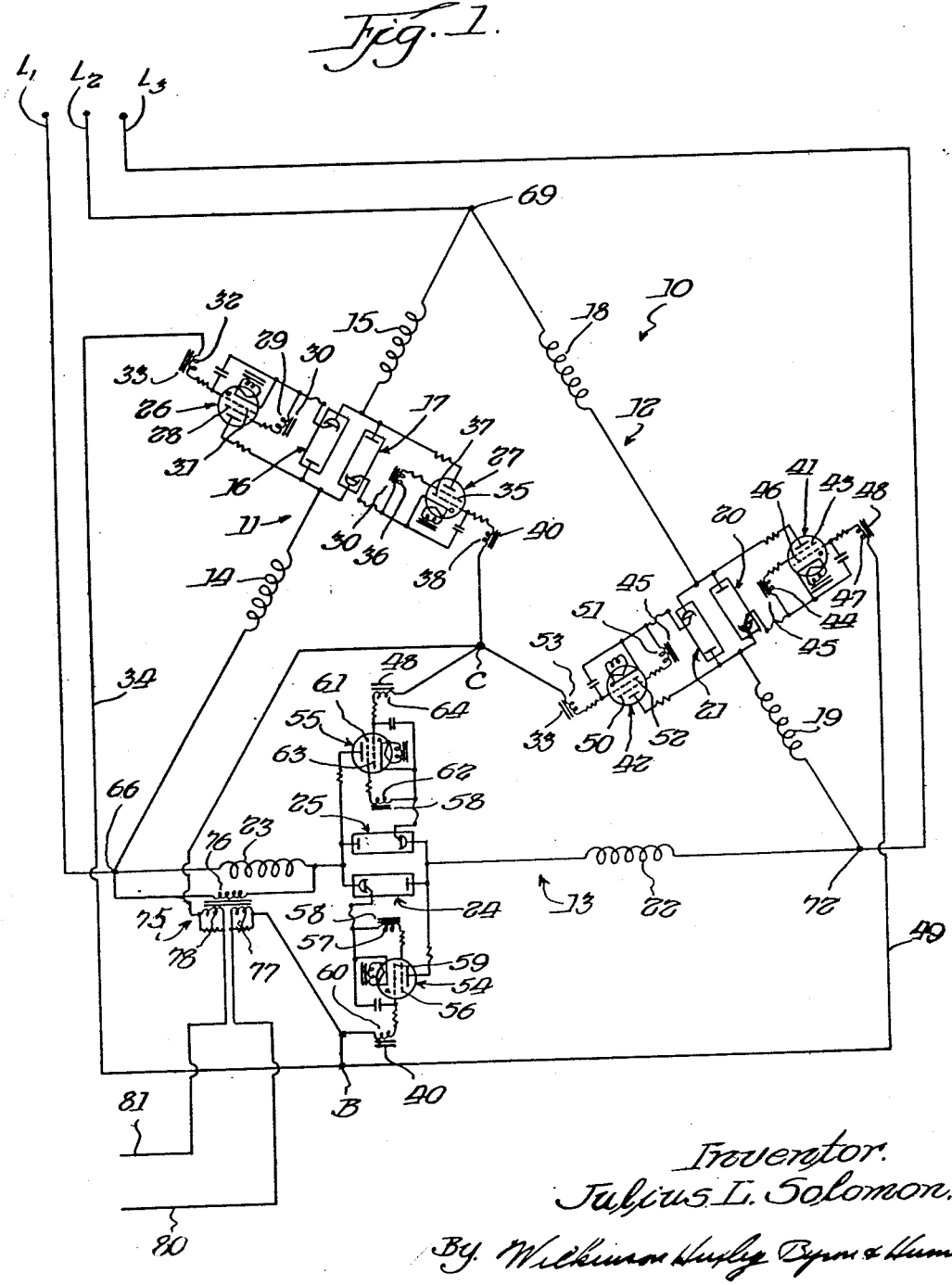
Figure 1 is a wiring diagram of a three phase-three winding system of the type shown in the Sciaky Patent No. 2,431,083 and which is representative of the systems to which the present control circuit has application, the said figure illustrating the electronic elements and circuit connections for controlling the firing of the ignitron tubes.

Referring more particularly to Figure 1, the invention is illustrated as applied to a three phase welding system which is characterized by an inductive device such as a welding transformer having a plurality of primary windings in inductive relation with a secondary winding, it being understood that the welding load circuit includes the secondary winding since the welding current is induced therein. No disclosure has been made of the secondary winding since the same is conventional, and only the primary circuit of the welding transformer has been disclosed as having three primary windings which are individually connected to a phase of the three phase source of supply. The leads $L_1$, $L_2$ and $L_3$ represent the conductors of the three phase alternating current supply source and which are so connected to the welding transformer 10 that primary winding 11 is connected across $L_1$ and $L_2$, with primary winding 12 being connected across $L_2$ and $L_3$, and primary winding 13 being connected across $L_3$ and $L_1$. Each primary winding may comprise a number of windings connected in series but for illustrative purposes each primary winding has been shown as including a pair of windings with the ignitron tubes being located therebetween. For example, primary winding 11 includes windings 14 and 15 and which have electrical connection with a pair of ignitron tubes 16 and 17 disposed between the windings and which tubes are connected in anti-parallel, or, in other words, the cathode of one is electrically connected to the anode of the other. Primary winding 12 includes windings 18 and 19 with ignitron tubes 20 and 21 being connected between the windings in anti-parallel relation with each other. Primary winding 13 includes windings 22 and 23, the same having ignitron tubes 24 and 25 electrically connected in anti-parallel relation and disposed between the windings.

In operation of the system as disclosed the ignitrons for the various primary windings perform a controlling function so that positive or negative half cycles of alternating current are supplied to the windings in sequence according to the phase relation of the electromotive forces in the three phase supply line. For example, the ignitrons 16, 20 and 24, constituting one group, are rendered conductive for passing positive half cycles of current in sequence according to the phase relation of the electromotive forces in the polyphase supply. Before the magnetizing effect of the flow of one positive half cycle through winding 11 dies out the phase relation of the electromotive forces in the three phase supply is such that the next half cycle of positive current is supplied to winding 12 and thereafter to winding 13 and the same continues in sequence for the duration of the welding period. Since the magnetizing current impulses flow in the same direction through the primary windings the magnetic flux will continue to rise until a predetermined maximum is reached, when the ignitrons are simultaneously rendered non-conductive. This rise in the magnetic flux has the effect of inducing a unidirectional current in the secondary circuit (not shown) and which constitutes a single welding impulse. See Figure 8. For the next operation of the system as disclosed the ignitrons 17, 21 and 25, comprising the second group, are rendered conductive and negative half cycles of current are passed through the respective windings according to the phase relation of the electromotive forces. However, the current flow in each primary winding is now opposite in direction to the positive half cycles although they have the same effect of producing a unidirectional rise in the magnetic flux to induce a unidirectional current in the secondary circuit. The polarity of this unidirectional current is opposite to the welding impulse produced by the positive half cycles and so a form of alternating current can be secured from the present system by rendering the groups of ignitrons alternately conductive. See Figure 9.

The reversing control and timing circuit of the invention is designed to render the groups of ignitrons alternately conductive and to control the magnetizing period, that is, the weld time, and also control the "off" time between successive welding impulses. This is accomplished through the provision of common cathode and grid points, respectively, the same having connection with the grid-cathode circuits of thyratrons or firing valves which are provided to control the conductivity of the ignitrons. By applying control potentials to common cathode and grid points it is possible to render the groups of ignitrons conductive in an alternate manner and to conveniently regulate the length of the conducting period and the length of the "off" time between said periods. For a complete description of a three phase welding system such as disclosed, having common cathode and grid points providing a sequence control circuit for the ignitrons thereof, reference is made to my copending application Serial No. 34,538, filed June 22, 1948, and entitled Sequence Control Circuit and Timer.

The thyratrons for the ignitrons 16 and 17 are indicated by numerals 26 and 27, each thyratron consisting of an anode, a cathode, and having a control grid and a screen grid. The screen grid 28 for thyratron 26 is connected to the secondary winding 29 of transformer 30. The control grid 31 for said thyratron 26 is electrically connected to the secondary winding 32 of transformer 33, the said secondary having electrical connection through conductor 34 to common grid point B for the group of ignitrons, namely, 16, 20 and 24. Thyratron 27 has its screen grid 35 connected to secondary winding 36 of transformer 30, whereas, its control grid 37 is connected to secondary winding 38 of transformer 40, the said winding having connection to the common grid point C for the second group of ignitrons, namely, 17, 21 and 25.

In a similar manner ignitrons 20 and 21 are provided with thyratrons or firing valves 41 and 42 and the same structure is provided for ignitrons 24 and 25 which have the thyratrons 54 and 55 associated therewith. The circuit for each thyratron is the same as described for 26 and 27, it being understood that the control grids and screen grids have electrical connection with secondary windings of the transformers as indicated for purposes which will be presently described. It may be mentioned that the primaries of the transformers 30, 45 and 58 are located in the phase shift control of Figure 2.

Thyratrons 26, 41 and 54 will control the firing of the first group of ignitrons and will maintain them conductive for a predetermined period of time, depending on the control of the thyratrons. In a similar manner thyratrons 27, 42 and 55 will control the second group of ignitrons and will also maintain them conductive for a predetermined period of time depending on the control of the thyratrons. In operation of the present welding system all the tubes are held in a quiescent state by maintaining the grid points B and C highly negative with respect to the common cathode point A, Figure 2. When it is desired to render the first group of ignitron tubes conductive point B is made slightly positive with respect to point A and C is maintained negative as before. Ignitron tubes 16, 20 and 24 are accordingly fired and are maintained conductive for a period of time which is preset by the timing control to be presently described. At the end of the weld time point B is made negative with respect to point A as before and after a predetermined "cool" time point C is made slightly positive. The ignitron tubes 17, 21 and 25 are now fired and they remain conductive for the preset interval as determined by the adjustment of the timing control.

In order to provide a common cathode point a plurality of transformers connect point A with the leads L1, L2 and L3, respectively, all as clearly shown in Figure 2. Conductor 65 connects point A with the terminal point 66 of lead L1 and this conductor includes the primary winding 67 of the transformer 40 having the two secondary windings 38 and 60. Conductor 68 connects point A with terminal point 69 of lead L2 and the conductor includes a primary winding 70 of the transformer 33. In a similar manner conductor 71 connects point A with the terminal point 72 of lead L3, the conductor including a primary winding 73 of the transformer 48. It is necessary that high impedance means be included in each conductor otherwise the primary windings 11, 12 and 13 would be short circuited. This accounts for the windings 67, 70 and 73 of the transformers 40, 33 and 48, each of which has two secondary windings, the same being located in the grid circuits for the thyratrons respectively. Since current is flowing through conductors 65, 68 and 71 at all times the current flow through windings 67, 70 and 73 will produce an alternating current voltage across each winding. It is necessary to cancel out said alternating current voltages if the desired control voltages are to be impressed between the grid and cathode terminals of the firing valves. The alternating current voltages appearing across each of the windings in the conductors for point A are cancelled out by the equal and opposite voltage induced in the secondary windings provided therefor respectively. The firing valves will thus have impressed between the grid and cathode terminals thereof whatever control voltages are applied to the points A and B and A and C.

During the conducting periods for the groups of ignitrons another condition exists in that a direct current voltage appears across each winding of the welding transformer primaries 11, 12 and 13. This will be understood by observing Figures 1 and 2 which clearly shows each primary winding as connected in series relation with the cathode circuit of its respective firing valve. For reasons explained it is necessary to cancel this direct current voltage developed across each primary winding due to flow of current in the same and which is effected by a transformer 75 having a primary winding 76 and two secondary windings 77 and 78. The primary winding 76 is connected across winding 23, for example, of the welding transformer and secondary winding 77 is connected with the grid point B and with a voltage source to be presently described which applies the control potentials to grid point B. In a similar manner secondary winding 78 is connected by conductor 81 with grid point C and with said voltage source which applies the control potentials to said grid point C. The voltage induced in each secondary is equal and opposite to the direct current voltage across a primary winding of the welding transformer and each secondary is electrically connected in series relation with the grid circuit of one group of firing valves. Without this transformer structure the following action would result. One group of ignitrons upon being conductive would pass current through the windings of the welding transformer. As flow of current continues the voltage developed across the windings of the welding transformer, and which are connected to the cathode of the thyratrons, would bring their grids negative with respect to the cathodes and this would render the ignitron nonconducting. The secondary windings 77 and 78 are introduced in the respective grid circuits and in this way they cancel the undesired voltages and the ignitrons are completely responsive to the control voltages applied to points B and C.

It was previously explained that the thyratrons would fire to render the ignitrons conductive upon the application of a positive potential to points B or C with respect to the common cathode point A. The control voltages applied to the grid points B and C are effective to fire the thyratrons provided the screen grids of the thyratrons as well as the control grids are positive at the start of the particular half cycle. The invention provides phase shift means as best shown in Figure 2 whereby the positive potential applied to the screen grids of the thyratrons may be delayed in order to delay the firing of the ignitrons and thus control the magnitude of the welding current. The secondary windings 29 and 36 of the transformer 30 are inductively associated with primary windings 82 provided by the phase shift device of Figure 2. In a similar manner the secondary windings 44 and 51 of transformer 45 are inductively associated with the primary windings 83 and the secondaries 57 and 62 of transformer 58 are inductively associated with the primary windings 84. By shifting the voltage across the respective primary windings 82, 83 and 84 with respect to the line voltage of the respective phases it is possible to hold the screen grids of the thyratrons in a negative condition for a period of time after the control grids are rendered positive, following the start of a positive or negative half cycle as regards the particular phase. This acts to delay firing of the thyratrons so that only a predetermined portion of each half cycle for the various phases is caused to flow through the windings. By adjusting the point in the half cycles at which the ignitrons are rendered conductive it is possible to control the magnitude of the welding impulse and in accordance with the invention the phase shift arrangement of Figure 2 includes phase shift means for controlling the magnitude of the welding current and separate and independent phase shifting means operating automatically at the end of the welding period for controlling the postheating current.

The phase shift device of Figure 2 essentially consists of conductors 85, 86 and 87 connected in delta relation to the three phase supply line, it being observed that conductor 85 is connected across phase $L_1$—$L_2$ and that the same has in series therewith the fixed resistor 88 and an adjustable resistor 90, the latter having a slider 91. Conductor 86 is connected across phase $L_2$—$L_3$ and has connected in series therewith resistor 92 and the adjustable resistor 93 having the slider 94. In a similar manner conductor 87 is connected across phase $L_3$—$L_1$, and the same is connected in series with the resistor 95 and the adjustable resistor 96 having the slider 97. The primary windings 82, 83 and 84 are connected to the adjustable resistors through their sliders by means of relay actuated contactors 100, each contactor 100 having a current limiting resistor 101 in parallel therewith and it will be observed that the contactors 100 are normally closed so that a connection is normally maintained through the sliders with the phase shifting circuit consisting of the adjustable resistors 90, 93 and 96 and the fixed resistors 88, 92 and 95. As a result of the normally closed contactors 100 the primary windings 82, 83 and 84 are normally connected across the respective phases of the power supply line by said phase shifting circuit and accordingly the same constitutes the device for controlling the magnitude of the welding current. In operation of the present welding system the firing of the thyratrons can be delayed for a fraction of a half cycle, depending on the setting of sliders 91, 94 and 97, which are mechanically joined so that they can be rotated in synchronism and to a like extent. By the adjustment of sliders 91, 94, 97, for example, the current flowing through winding 82 instead of being in phase with $L_2$—$L_3$, the phase of said current is shifted toward $L_1$—$L_2$. Also with respect to the current flowing through winding 83 by adjustment of sliders 91, 94 and 97, the phase is shifted toward $L_2$—$L_3$, and in a similar manner the phase of the current flowing through winding 84 is shifted by adjustment of sliders 91, 94, 97 toward $L_3$—$L_1$. As previously explained, the winding 82 constitutes the primary of the transformer 30 having the two secondaries 29 and 36 so that when a positive voltage is applied to their screen grids after a predetermined delay, the respective thyratrons are caused to fire to render the ignitrons 16 and 17 conductive. The phase shift with respect to primary winding 83 and primary winding 84 is similar to that described so that the transformer 45 and 58 and their respective secondary windings are controlled in a similar manner and firing of their thyratrons is also delayed so that all the ignitrons are rendered conductive at the same relative point in the half cycles.

When the sliders 91, 94 and 97 are set as described the welding current will be something less than the maximum for the particular welding device. When the sliders are rotated in the direction of the arrows to the maximum extent, the welding current will be at the maximum since in this position the voltage across the primary winding 82 will have been advanced so that it becomes more nearly in phase with $L_1$—$L_2$ and the voltage across the primary winding 83 will be advanced toward $L_2$—$L_3$ and likewise the voltage across primary winding 84 will be advanced toward $L_3$—$L_1$. The positive potentials applied to the screen grids of the thyratrons will be substantially in phase with their respective line voltages so that the thyratrons will fire at the start of the half cycles and maximum current will be passed through the primary windings of the welding transformer.

It will be further understood that when sliders 91, 94 and 97 are rotated to secure the minimum heating effect, the setting of the sliders will be such as to shift the voltages so that the voltage across winding 82 will be substantially in phase with $L_2$—$L_3$, and to shift the voltage across winding 83 so that the same will be substantially in phase with $L_3$—$L_1$, and likewise with respect to winding 84, the voltage will be shifted so that the same is substantially in phase with $L_1$—$L_2$. This setting will produce a phase shift of 120 degrees and represents the minimum heat setting for the present welding system.

In accordance with the invention the phase shift device of Figure 2 includes a separate and independent phase shifting circuit for controlling the magnitude of the postheating current, the same being automatically rendered operative at the end of the welding period, provided the present system is manually set for postheating. Conductor 102, connected across phase $L_1$—$L_2$ includes the fixed resistor 103 and the adjustable resistor 104 having the slider 105. Conductor 106 connected across phase $L_2$—$L_3$ includes the fixed resistor 107 and the adjustable resistor 108 having the slider 109. The conductor 110 connected across phase $L_3$—$L_1$ includes the fixed resistor 111 and the adjustable resistor 112 having the slider 113. The sliders 105, 109 and 113 are mechanically connected together so that they may be simultaneously rotated and to a like extent. The phase shifting circuit just described is electrically connected to the windings 82, 83 and 84 through the sliders 105, 109 and 113 by means of the relay-actuated contactors 114. A current limiting resistor 115 is connected across each contactor 114 and it will be seen that the said contactors are normally open so that the phase shifting device for controlling the postheating current is inoperative except when the contactors 114 are closed. The operation of the relay-actuated contactors 100 and 114 is such that the two sets of contactors are energized simultaneously so that one set, namely, contactors 100, are caused to open when the other set, namely, contactors 114, are caused to close. The effect of this operation is to render the phase shifting circuit for controlling the welding current inoperative and to render operative the phase shifting circuit for controlling the postheating current. Since postheating is effected by a controlled decay of the current in the welding circuit it necessarily follows that the setting of the sliders 105, 109 and 113 is such as to produce a considerably lower current than is produced by the setting of the sliders 91, 94 and 97.

The common cathode point A is connected by a conductor 118 to the resistance 119 by means of the slider 120, Figure 3. Said resistance 119 constitutes a voltage divider so that the potential on the common cathode point A can be regulated by moving the slider 120 along the resistance. The power supply for said resistance 119, which constitutes a source of direct current for the operation of the timing circuits, consists of transformer 121 having connected thereto the full wave rectifier tube 122 for supplying direct current to the respective terminals of the resistance 119. The usual reactor 123 and the condenser 124 are included in the circuit, all in accordance with conventional practice.

The vacuum tube 125, Figures 3 and 6, having a control grid 126, is connected to the positive terminal of resistance 119 through its plate. The cathode of said tube 125 is connected to the plate of a control tube 127 comprising a gas filled, grid controlled tube having a control grid 128. The circuit from the cathode of tube 127 includes the condenser 130 and the diode 131, the cathode of which connects with conductor 132, which in turn has adjustable connection through slider 133 with the negative end of resistance 119. The adjustable resistor 134 is connected across the terminals of condenser 130, the said resistor providing adjustment for varying the "off" time, sometimes referred to as the "cool" time, between welding impulses. For charging condenser 130 an independent power source is provided including transformer 135 and rectifying device 136, the same having suitably connected across its terminals condenser 137 and the resistance 138. The negative end of this power source is connected through conductor 140 to the peaking transformer 141, which in turn has suitable connection with the control grid 128 of tube 127. The switch 142 is normally closed and in order to start an "on" time period the switch must be opened to allow condenser 130 to discharge through adjustable resistor 134. The negative bias normally applied to grid 128 of tube 127 is gradually made more positive until presently a pulse from the peaking transformer 141 will fire tube 127, causing the same to conduct and establish the circuit also including tube 125 and the diode 131. When tube 127 is conducting the potential applied to one of the grid points, either B or C, in the welding transformer is made positive with respect to the common cathode point A so that one group of ignitrons is rendered conductive to induce a welding current impulse in the secondary circuit by flow of current through the primary windings 11, 12 and 13. When the switch 142 is closed the condenser 130 is charged by the independent power source and the negative grid bias applied to the grid of tube 127 is sufficient to hold the tube 127 in a non-conductive state.

The resistance 143 is connected across the conductors 132 and 144, Figures 3 and 7, and the adjustable slider 145 is in circuit with the plate of tube 146, said circuit also including the condenser 147 and the adjustable resistor 148. The adjustment of the resistor 148 controls the "on" time period, generally referred to as the "weld" period. During conduction of tube 127 current will flow through resistance 143 and accordingly condenser 147 is charged with the charging rate being controlled by adjustment of resistor 148. As condenser 147 charges the voltage across the same increases exponentially, whereas, the voltage across resistor 148 decreases exponentially. After a predetermined charging time condenser 147 will discharge through tube 146 since a pulse from peaking transformer 150 will render its control grid 151 positive. The numerals 152, 153 and 154 comprise control switches and it will be assumed for purposes of this description that the slider for each switch is located at position No. "1," which position renders the postheating elements of the control circuit inoperative. The slider for each switch may also be located in a No. 2 position which renders the postheating elements of the control circuit operative. As a result a gradual and controlled decay of the welding current takes place as will be hereinafter described in detail. For position No. 1 the control circuit will produce a single welding impulse or a plurality of welding impulses, depending on the length of time switch 142 is held open, and it will of course be understood that switch 142 may be actuated manually or the switch may be included in an automatic arrangement for predetermining the welding pulses delivered by the present system. For a single welding pulse it is only necessary to momentarily open switch 142 since a firing of tube 127 will initiate the welding operation and the same will continue until the cycle has been completed even though switch 142 may have been previously closed. With the sliders of switches 152, 153 and 154 in No. 1 position tube 146 will discharge through windings 155 and 156 of transformers 157 and 158, respectively, having secondary windings 164 and 167. The discharge of current through winding 155 of transformer 157 is such as to deliver a negative pulse to grid 126 of tube 125 to thereby stop conduction through said tube and its associated circuit including the control tube 127 and diode 131. This accordingly terminates the "on" time period. Referring again to the pulse through winding 155, it will be understood that the sliders of switches 159, 160, 161, 162 and 163 are all in position No. 1 so that the secondary winding 164 is thus connected at one end through conductor 165 to the grid 126 and at its opposite end through conductor 166 to the cathode of said tube 125.

The discharge of condenser 147 through tube 146 and through winding 156 of transformer 158 will energize its secondary winding 167 which is located in the reversing circuit shown in Figures 3 and 5 and which includes the gas filled, grid controlled thyratrons 168 and 170. It will be seen that these tubes have electrical connection with conductors 80 and 81, which lead respectively to the grid points B and C so that the potential on said points B and C is controlled by the conductivity of tubes 168 and 170. The circuit arrangement for said tubes is such that only one tube is conductive at a time and also said circuit arrangement effects an automatic switching from one tube to the other to thereby change the potentials on points B and C to render the groups of ignitrons controlled thereby alternately conductive so that the welding device produces a form of alternating current such as shown in Figure 9 without postheat and in Figure 11 with postheat. The structure of the reversing circuit will now be described.

A power supply in the form of a transformer 171 has suitably connected thereto the full wave rectifying tube 172 which supplies direct current to the respective terminals of resistance 173 constituting a direct current source for energizing tubes 168 and 170. The positive terminal of resistance 173 is connected by conductor 174 to resistances 175 and 176, the opposite end of said resistances being connected respectively to the plates of tubes 168 and 170. Said opposite ends of the resistances are also connected to each other through condenser 177. The negative end of resistance 173 is joined by conductor 178 to secondary winding 167 of transformer 158. Conductors 180, 181 and 182 connect with the grids of the tubes.

The operation of the reversing or switching circuit above described can best be understood by assuming that tube 168 is conducting so that current flows from the positive end of resistor 173 through resistance 175 to tube 168. As a result the condensers 177 are charged to the voltage across 175 with the negative terminal of said condensers having connection with the plate of tube 168. The pulse of current supplied to secondary winding 167 by the discharge of tube 146 is such as to start conduction of tube 170. When this takes place the positive terminal of condensers 177 is directly connected through tube 170 to the cathode of tube 168. This automatically stops conduction through tube 168 since its plate is negative, whereas its cathode is now positive. However, tube 170 continues to conduct and the voltage developed across resistance 183 is such as to maintain tube 168 in a nonconductive state until the next pulse of current is delivered to secondary winding 167. The next pulse produces the same action with respect to tube 170, which is rendered nonconductive as 168 becomes conductive again. The switch from one tube to the other is therefore automatic, being effected by a current pulse delivered to winding 167.

The potential applied to conductor 81 and thus to grid point C is obtained from the voltage between slider 120 and the positive end of resistance 119 plus the voltage from slider 145 and the positive end of resistance 143, the sum of these voltages alternating between plus 90 or minus 110, depending on whether tube 127 is conducting or nonconducting. To the above potential must be added the voltage across resistance 175 and which alternates between zero and minus 480 or more, depending on whether tube 168 is not conducting or is conducting. If said tube 168 is not conducting the voltage on grid point C when the tube 127 fires, which initiates the welding period, will be plus 90. Accordingly, the thyratrons having connection with grid point C will fire and render ignitrons 17, 21 and 25 conductive to effect a flow of current through the primary windings of the welding transformer.

The potential on point B is the sum of the voltages across the positive end of resistance 119, resistance 143 and the voltage across resistance 176. The potential on grid point B will be plus 90 when tube 170 is not conducting and when control tube 127 is conducting. Accordingly, each time tube 127 conducts for a welding period either grid point C and associated thyratrons and ignitrons, or grid point B and associated thyratrons and ignitrons, are rendered conductive, depending on whether tube 168 or 170 is conducting.

In the welding of aluminum alloys a postheating current is employed following the welding pulse to slow down the rate of cooling of the weld metal in order to avoid cracking and fissures due to too rapid cooling. Slow decay is effected by a current decay control including the postheating phase shift circuit which is made operative at the proper time when the various switches shown in Figure 3 are located in postheat position, that is, No. 2 position. The circuit elements function as follows for postheating.

After tube 127 fires for a weld period the welding time is governed by the charging of capacitor 147 through the adjustable resistor 148. Eventually tube 146 will discharge capacitor 147 at a positive pulse from peaking transformer 150, said tube 146 discharging capacitor 147 only through winding 155 of transformer 157 since winding 156 is not now in circuit therewith by reason of the No. 2 position of switch 153. As a result of the No. 2 position of switches 161 and 162 the secondary winding 164 of said transformer 157 is now located in the grid-cathode circuit of the gas filled, grid controlled tube 184 having a control grid 185 which is electrically connected to a peaking transformer 186 through the rectifying circuit 187. The plate of said tube 184 is connected to conductor 144 and its cathode has connection through resistor 188 with conductor 132. The circuit including the condenser 190 and the adjustable resistor 191 is in parallel with resistor 188, and it will be understood that the adjustable resistor 191 controls the postheating period by controlling the charging rate of condenser 190. The pulse delivered to winding 164 when tube 146 discharges is sufficient to drive the grid 185 positive and tube 184 is thus rendered conductive to cause current to flow through resistance 188 since these elements are in parallel with resistance 143. A conductor 192 connects the positive end of resistance 188 with the grid controlled vacuum tube 193 shown in Figure 4 and the action of current flow through resistance 188 is such as to change the grid bias on tube 193 from negative to positive so that tube 193 is rendered conductive.

Tube 193 has its independent power supply consisting of transformer 194, the full wave rectifier 195, and filter circuit consisting of capacitors, reactor and bleeder resistor 196. The negative end of the power supply is joined through conductor 197 to slider 120. Tube 193 is in series with the relay windings 200 and 201 and said windings together with tube 193 constitute a parallel connection across resistance 196. When tube 193 is conducting said relays are energized and the contactors in the phase shift circuits are actuated. The normally closed contactors 100 are caused to open and the normally open contactors 114 are caused to close. Whatever may be the setting for the welding phase shift circuit it will be understood that the postheating phase shift circuit has a setting so as to materially delay the firing of the thyratrons and as a result the welding current is considerably reduced to reduce the heating effect accordingly. Therefore, this controlled decay of the welding current is such as to properly anneal the weld metal to produce a uniformly solid and efficient weld.

The timing for the postheating period is effected by means of the condenser 190 and the gas filled, grid controlled tube 202 having a grid 203. The plate of said tube has connection with said condenser, whereas the cathode of said tube has connection through conductors 204 and 205 with winding 156 of transformer 158, it being understood that switches 153 and 154 are still in No. 2 position. As condenser 190 charges the potential across its plates increases exponentially whereas the voltage across the adjustable resistor 191 decreases exponentially. Eventually a positive pulse from the peaking transformer 206 will render grid 203 positive, firing tube 202 and discharging condenser 190 through said tube. A pulse of current accordingly flows through winding 156 to energize its secondary winding 167 in the reversing control panel. This pulse will shift the conductivity of tubes 168 and 170. Simultaneously therewith a current pulse is caused to flow through winding 207 of transformer 208 having a secondary winding 209. Said secondary winding by reason of the No. 2 position of switches 159 and 160 is located in the grid-cathode circuit of tube 125 and the current pulse is such as to render 125 nonconductive. This action stops flow of current through the control tube 127 and associated elements and thus terminates a welding operation which has included a welding period plus a postheating period for the purposes explained.

With the switch 142 in open position and control tube 127 nonconducting, it will be seen that condenser 130, which has been charged during the weld period, will now start to discharge through resistor 134 which accordingly controls the cool time. As condenser 130 discharges a point is reached when the grid bias on grid 128 of tube 127 will have been rendered sufficiently positive for a pulse from peaking transformer 141 to again fire the control tube 127. When tube 127 is rendered conductive current flow takes place through its associated circuit and another weld period is initiated with postheating taking place as long as the various switches are located in their No. 2 position, Figures 10 and 11 illustrating single and multiple welding operations respectively with controlled decay of the welding current for postheating the weld metal as herein described.

What is claimed is:

1. In a welding system, a welding transformer, an alternating current supply source electrically connected to the input of said transformer, a welding load circuit electrically connected to the output of said transformer, means for producing in the load circuit an impulse of welding current, said current being characterized as of modulated shape consisting of a pulse of welding current followed by a controlled decay of said current for postheating, said means including phase shift circuits for respectively controlling the magnitude of the welding current and the magnitude of the postheating current, and means automatically operative at a predetermined point in the welding operation for rendering one of said phase shift circuits operative and the other inoperative.

2. In a welding system, a welding transformer, an alternating current supply source electrically connected to the input of said transformer, a welding load circuit electrically connected to the output of said transformer, means for producing in the load circuit an impulse of welding current, said current being characterized as of modulated shape consisting of a pulse of welding current followed by a controlled decay of the current for postheating, said means including a normally operative phase shift circuit for controlling the magnitude of the welding current and a normally inoperative phase shift circuit for controlling the magnitude of the postheating current, and means automatically operative at a predetermined point in the welding operation for rendering the first mentioned phase shift circuit inoperative and the second mentioned phase shift circuit operative.

3. In a welding system, a welding transformer, an alternating current supply source electrically connected to the input of said transformer, a welding load circuit electrically connected to the output of said transformer, means for producing in the load circuit an impulse of welding current, said current being characterized as of modulated shape consisting of a pulse of welding current followed by a controlled decay of the current for postheating, said means including a normally operative phase shift circuit for controlling the magnitude of the welding current and a normally inoperative phase shift circuit for controlling the magnitude of the postheating current, means for timing the duration of the welding period, other means for timing the duration of the postheating period, and electronic circuit means connecting the timing means with the other timing means and rendered effective by said timing means at the end of the welding period for rendering the other timing means operative for timing the postheating period and for also simultaneously effecting a switch in the phase shift circuits, whereby the normally operative phase shift circuit is rendered inoperative and the normally inoperative phase shift circuit is rendered operative.

4. In a welding system, a welding transformer, an alternating current supply source electrically connected to the input of said transformer, a welding load circuit electrically connected to the output of said transformer, means for producing in the load circuit an impulse of welding current, said current being characterized as of modulated shape consisting of a pulse of welding current followed by a controlled decay of the current for postheating, said means including a normally operative phase shift circuit for controlling the magnitude of the welding current and a normally inoperative phase shift circuit for controlling the magnitude of the postheating current, adjustable means including electronic circuit elements for timing the duration of the welding period, other adjustable means including other electronic circuit elements for timing the duration of the postheating period, and electronic circuit means rendered effective by said first mentioned timing means by its action in terminating the welding period for starting operation of the other timing means for timing the postheating period and for effecting a switch in the phase shift circuits, whereby the normally operative phase shift circuit is rendered inoperative and the normally inoperative phase shift circuit is rendered operative.

5. In a welding system of the three phase-three winding type wherein three windings are connected in delta relation to a three phase supply and wherein a load circuit is inductively associated with said windings, of a phase shift circuit including adjustable means for selecting a particular value of current for the load circuit and thus a particular welding heat, timing means for timing the welding period, a second phase shift circuit also including adjustable means for selecting a lower value of current for the load circuit for postheating the weld metal, means for timing the postheating period, and electronic circuit means rendered effective by the timing means for timing the welding period for rendering the first mentioned phase shift circuit inoperative and the second mentioned phase shift circuit operative and for simultaneously starting operation of the timing means for timing the postheating period.

6. In a welding system, in combination, a source of polyphase alternating current, an inductive device having primary windings corresponding in number to the phases of the alternating current source, circuit means connecting each winding to its respective phase of said source, at least one electric discharge valve for each winding for controlling flow of unidirectional currents through the winding, means controlling the firing of the electric discharge valves including a normally operative phase shift circuit and a normally inoperative phase shift circuit, whereby the value of the welding current is determined by the setting of that phase shift circuit which is operative at the time, and means adapted to operate at a predetermined point in the welding operation for rendering the normally operative phase shift circuit inoperative and the normally inoperative phase shift circuit operative.

7. In a welding system, in combination, a source of polyphase alternating current, an inductive device having primary windings corresponding in number to the phases of the alternating current source, circuit means connecting each winding to its respective phase of said source, at least one electric discharge valve for each winding for controlling flow of unidirectional currents through the winding, means controlling the firing of the electric discharge valves for producing a welding current including an adjustable phase shift circuit that is normally operative, timing means for timing the duration of the welding current, other means controlling the firing of the electric discharge valves for effecting a decay in the welding current in a controlled manner for postheating purposes including an adjustable phase shift circuit and which is normally inoperative, second timing means for controlling the duration of the postheating period, and means rendered operative by the action of the timing means in timing the duration of the welding current for effecting a switch in the phase shift circuits, whereby the first mentioned phase shift circuit is rendered inoperative and the second mentioned phase shift circuit is rendered operative, said means also simultaneously starting operation of the second timing means for timing the duration of the postheating current.

8. In a welding system of the three phase-three winding type wherein three windings are connected in delta relation to a three phase supply, and wherein a load circuit is inductively associated with said windings, a pair of inversely connected discharge valves for each winding in series with their winding, a firing valve for each discharge valve for rendering the discharge valve conductive when the firing valve is conductive, said discharge valves comprising two groups with each group having one valve in each winding so that when one group is conductive current will flow in one direction through the windings and in an opposite direction when the other group is conductive, means for producing in the load circuit an impulse of welding current of modulated shape consisting of a pulse of welding current followed by a controlled decay of the current for postheating, said means including a normally operative phase shift circuit for controlling the magnitude of the welding current and a normally inoperative phase shift circuit for controlling the magnitude of the postheating current, said phase shift circuits controlling the welding and postheating currents by phase shifting the voltage applied to the grids of the firing valves with respect to the line voltage of their respective phase, means adapted to operate at a predetermined point in the welding operation for rendering the first mentioned phase shift circuit inoperative and the second mentioned phase shift circuit operative, and other means including a reversing circuit adapted to be energized at the end of the welding operation for alternating the conductivity of the two groups of discharge valves.

9. In a welding system of the three-phase winding type wherein three windings are connected in delta relation to a three phase supply, a pair of inversely connected discharge valves for each winding in series with their winding, a firing valve for each discharge valve for rendering the discharge valve conductive when the firing valve is conductive, said discharge valves comprising two groups with each group having one valve in each winding so that when one group is conductive current will flow in one direction through the windings and in an opposite direction when the other group is conductive, means controlling the conductivity of the firing valves including a normally operative phase shift circuit and a normally inoperative phase shift circuit, whereby the value of the welding current is determined by the setting of that phase shift circuit which is operative at the time, said phase shift circuits controlling the value of the welding current by phase shifting the voltage applied to the grids of the firing valves with respect to the line voltage of their respective phase, means adapted to operate at a predetermined point in the welding operation for rendering the first mentioned phase shift circuit inoperative and the second mentioned phase shift circuit operative, and other means including a reversing circuit adapted to be energized at the end of the welding operation for alternating the conductivity of the two groups of discharge valves.

10. In a welding system, a source of polyphase alternating current, a welding transformer having primary windings each having asymmetrically conductive electric discharge valves in circuit for controlling flow of unidirectional current impulses through the windings, a phase shift circuit for selecting the value of the current caused to flow through the primary windings to thereby produce a welding current of selected magnitude and thus a particular welding heat, a second phase shift circuit for selecting a current of lower value for flow through the primary windings to produce a postheating current, switch structure having two positions of adjustment, said switch structure determining the character of the welding operation according to the setting of the switch structure, said switch structure in one position rendering the first mentioned phase shift circuit effective for producing welding operations each consisting of a pulse of welding current only, and said switch structure in another position rendering both phase shift circuits effective in sequence for producing welding operations each consisting of a pulse of welding current followed by a postheating current.

11. A welding system as defined by claim 10, additionally including timing means for timing the duration of the pulse of welding current, other timing means for timing the duration of the postheating period, said switch structure in said one position rendering only the first mentioned timing means effective and said switch structure in its other position rendering both timing means effective in sequence.

12. In a welding system, a source of polyphase alternating current, a welding transformer having primary windings each having asymmetrically conducting electric discharge valves in circuit for controlling flow of unidirectional current impulses through the windings, a welding phase shift circuit for controlling the value of current caused to flow through the primary windings to thereby produce a welding current of predetermined magnitude, a postheating phase shift circuit for controlling the value of the current caused to flow through the primary windings to thereby produce a postheating current of lower value than the welding current, normally closed contactors for the welding phase shift circuit rendering the same normally operative, normally open contactors for the postheating phase shift circuit normally rendering the same inoperative, relay means for actuating the contactors when energized to cause the normally closed contactors to open and the normally open contactors to close whereby the welding phase shift circuit is rendered inoperative and the postheating phase shift circuit is rendered operative, and means adapted to operate at a predetermined point in the welding operation for energizing said relay means.

13. A welding system as defined by claim 12 additionally including timing means for timing the duration of the welding current, other timing means for timing the duration of the postheating current, and electronic circuit means rendered effective by said first mentioned timing means at the end of the welding current period for energizing the relay means to effect a switch in the phase shift circuits and for simultaneously starting operation of said other timing means for timing the postheating period.

14. In a welding system, a source of polyphase alternating current, a welding transformer having primary windings, two groups of asymmetrically conductive electric discharge valves in circuit with said windings and adapted to be alternately conductive for controlling flow of unidirectional current impulses through the windings, first in one direction and then in the opposite direction, a welding phase shift circuit for controlling the firing of the discharge valves to produce a welding current of predetermined magnitude, a postheating phase shift circuit for also controlling the firing of the discharge valves to produce a postheating current of lower value than the welding current, timing means for timing the duration of the welding current, timing means for timing the duration of the postheating current, switch structure for determining the character of the welding operation according to the setting of the switch structure, said switch structure in one position rendering only the welding phase shift circuit and said first mentioned timing means effective to thereby produce welding operations each consisting of a welding current only, said switch structure in another position rendering both phase shift circuits effective in sequence and both timing means also effective in sequence for producing welding operations each consisting of a welding current followed by a postheating current, and a reversing circuit adapted to be energized at the end of each welding operation for alternating the conductivity of the two groups of discharge valves.

15. In a welding system, a source of polyphase current, a welding transformer having primary windings corresponding in number to the phases of said source and having a load circuit inductively associated with the primary windings, circuit means electrically connecting each primary winding to its respective phase of said source, a pair of inversely connected discharge valves for each winding in series with their winding, a firing valve for each discharge valve for rendering the discharge valve conductive when the firing valve is conductive, circuit means for controlling the conductivity of said firing valves and thus the discharge valves in a manner to produce a welding current of predetermined magnitude with controlled decay of the current for postheating, said circuit means including a normally operative phase shift circuit for controlling the magnitude of the welding current, and a normally inoperative phase shift circuit for controlling the magnitude of the postheating current, welding current timing means for timing the duration of the welding current, postheating current timing means for timing the duration of the postheating current, circuit means electrically connecting the welding current timing means with the postheating current timing means, and electronic means in the circuit means rendered operative by the action of the welding current timing means in timing the welding current for initiating operation of the postheating current timing means and for simultaneously effecting a shift in the phase shift circuits, whereby the welding current phase shift circuit becomes inoperative and the postheating current phase shift circuit becomes operative.

16. A welding system as defined by claim 15, wherein certain discharge valves comprise one group for passing current through the windings in one direction when conductive and the remaining discharge valves comprise a second group for passing current through the windings in an opposite direction when conductive, and additionally including a reversing circuit adapted to be energized by the action of the postheating current timing means in terminating a welding operation for alternating the conductivity of the two groups of discharge valves.

JULIUS L. SOLOMON.

REFERENCES CITED

The following references are of record in the file of this patent:

UNITED STATES PATENTS

| Number | Name | Date |
|---|---|---|
| 2,200,077 | Dawson | May 7, 1940 |
| 2,251,237 | Biven | July 29, 1941 |
| 2,306,229 | Somerville | Dec. 22, 1942 |
| 2,306,230 | Somerville | Dec. 22, 1942 |
| 2,374,044 | Smith | Apr. 17, 1945 |